United States Patent [19]
Archibald et al.

[11] Patent Number: 6,158,820
[45] Date of Patent: Dec. 12, 2000

[54] AIR TIGHT VEHICLE WHEEL WITH LIGHTENER POCKET AND PROCESS FOR MANUFACTURING SAME

[75] Inventors: Kenneth R. Archibald, Canton; James D. Lambert, Jr., Livonia, both of Mich.

[73] Assignee: Hayes Lemmerz International, Inc., Northville, Mich.

[21] Appl. No.: 09/204,532

[22] Filed: Dec. 3, 1998

Related U.S. Application Data
[60] Provisional application No. 60/067,436, Dec. 3, 1997.

[51] Int. Cl.[7] ................................. B60B 1/06; B60B 3/06
[52] U.S. Cl. .................. 301/65; 29/894.324; 29/894.32; 301/95; 427/258
[58] Field of Search .................................... 301/65, 95, 96, 301/97, 98; 427/258, 287, 233, 234, 236, 239, 261, 410, 421, 386, 388.1; 29/894.32, 894.324, 894.325, 894.322, 894.323

[56] References Cited

U.S. PATENT DOCUMENTS

| | | |
|---|---|---|
| 4,150,854 | 4/1979 | Lohmeyer . |
| 4,289,186 | 9/1981 | Wilde . |
| 4,421,821 | 12/1983 | Matsubara et al. ...................... 428/323 |
| 4,436,133 | 3/1984 | Rohr ........................................ 301/65 |
| 4,763,392 | 8/1988 | Fogal et al. . |
| 5,360,261 | 11/1994 | Archibald et al. ........................ 301/65 |
| 5,421,642 | 6/1995 | Archibald ........................... 29/894.322 |
| 5,632,529 | 5/1997 | Wei .......................................... 301/95 |
| 5,638,591 | 6/1997 | Lamping et al. ......................... 301/95 |
| 5,794,340 | 8/1998 | Pollkötter ................................. 301/96 |
| 5,955,147 | 9/1999 | Serafin .................................... 427/286 |
| 5,997,102 | 12/1999 | Stanovich ........................... 29/894.322 |

*Primary Examiner*—S. Joseph Morano
*Assistant Examiner*—Jason R. Bellinger
*Attorney, Agent, or Firm*—MacMillan, Sobanski & Todd, LLC

[57] ABSTRACT

A layer of sealant is applied to a portion of the surface of a vehicle wheel to prevent air leakage therethrough.

28 Claims, 8 Drawing Sheets

FIG. 1

PRIOR ART

AIR TIGHT VEHICLE WHEEL WITH LIGHTENER POCKET AND PROCESS FOR MANUFACTURING SAME

CROSS REFERENCE TO RELATED APPLICATIONS

This application claims the benefit of U.S. Provisional Application No. 60/067,436, filed on Dec. 3, 1997.

BACKGROUND OF THE INVENTION

This invention relates in general to vehicle wheels and in particular to a light weight wheel which has a layer of sealant disposed upon a portion of a surface of the wheel to assure that the wheel is air tight.

Figure 1:
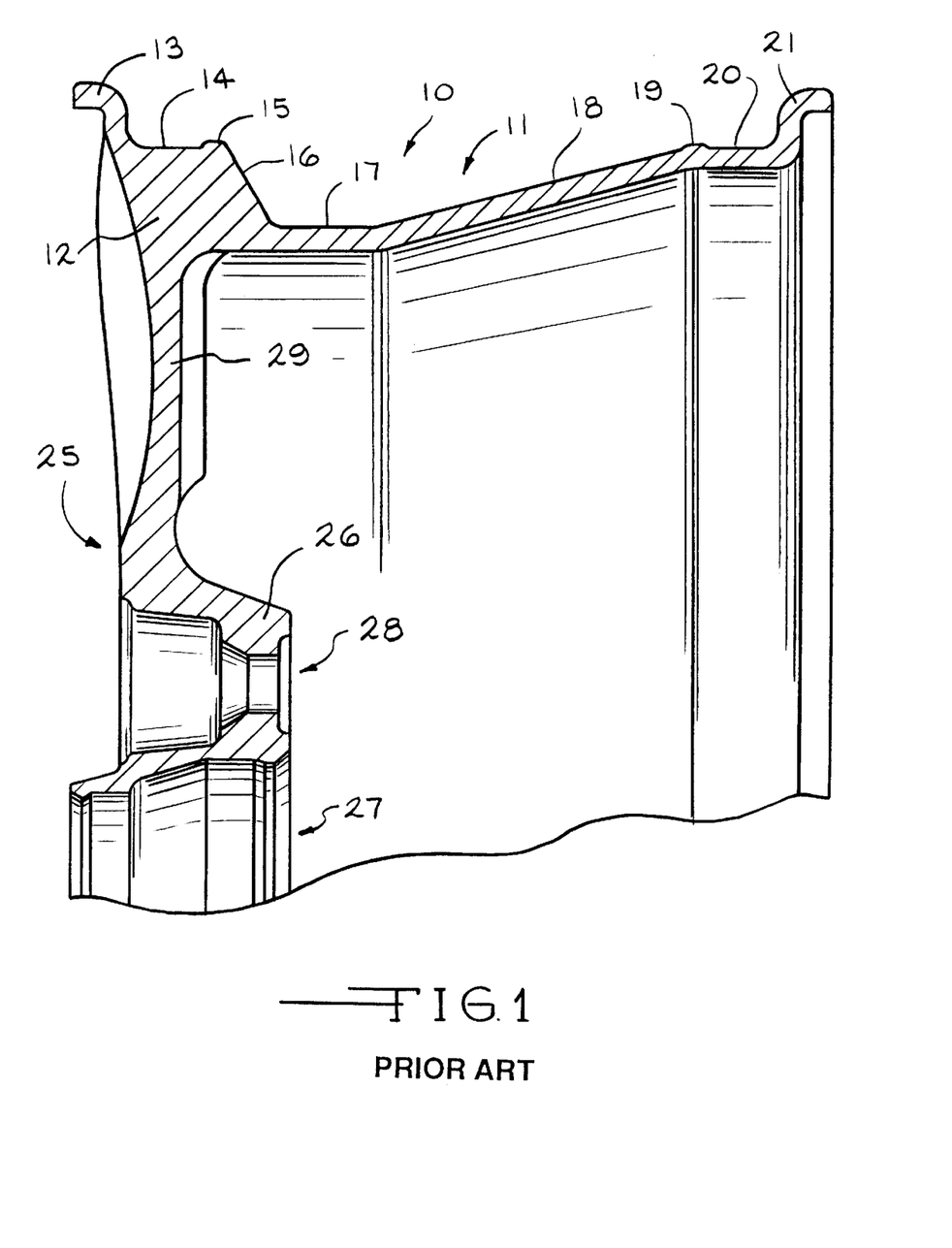
FIG. 1 is a fragmentary sectional view of a one piece wheel according to the prior art.

Light weight vehicle wheels formed from an alloy of a light weight metal such as aluminum, magnesium or titanium, are replacing steel wheels on an increasing number of vehicles. Such light weight wheels provide both a reduction in weight from steel wheels and an attractive appearance. Referring now to the drawings, there is shown in FIG. 1 a fragmentary sectional view of a typical prior art one piece light weight wheel 10.

The wheel 10 has an annular wheel rim 11 which is adapted to carry a vehicle tire. The outboard end of the wheel rim 11 includes an annular sidewall 12. Due to limitations of conventional casting processes, the sidewall 12 typically has a thick cross section. An outboard tire bead retaining flange 13, which extends in an outward radial direction, is formed upon the outboard end of the sidewall 12. An annular outboard tire bead seat 14 is formed in the outer surface of the sidewall 12 adjacent to the outboard tire bead retaining flange 13. The outboard tire bead seat 14 extends axially from the outboard flange 13 to an annular outboard tire bead hump 15. The outboard tire bead hump 15 is connected by a radial deep well wall 16 to a recessed annular deep well 17. The deep well 17 extends axially to an annular leg portion 18 of the wheel rim 11. The inboard end of the leg portion 11 is formed as an annular inboard tire bead hump 19. The inboard tire bead hump 19 is adjacent to an inboard tire bead seat 20 which extends axially from the inboard tire bead hump 19 to an inboard tire bead retaining flange 21. The inboard tire bead retaining flange 21 extends in an outward radial from the inboard end of the wheel rim 11.

The wheel 10 also has a wheel disc 25 which is formed across the outboard end of the wheel rim 11. The wheel disc 25 includes a wheel hub 26 having a central pilot hole 27 and a plurality of wheel lug holes 28 (one shown) formed therethrough. A plurality of spokes 29 (one shown) extend radially from the hub 26 to the wheel rim sidewall 12 and support the wheel hub 26 within the wheel rim 11.

Figure 2:
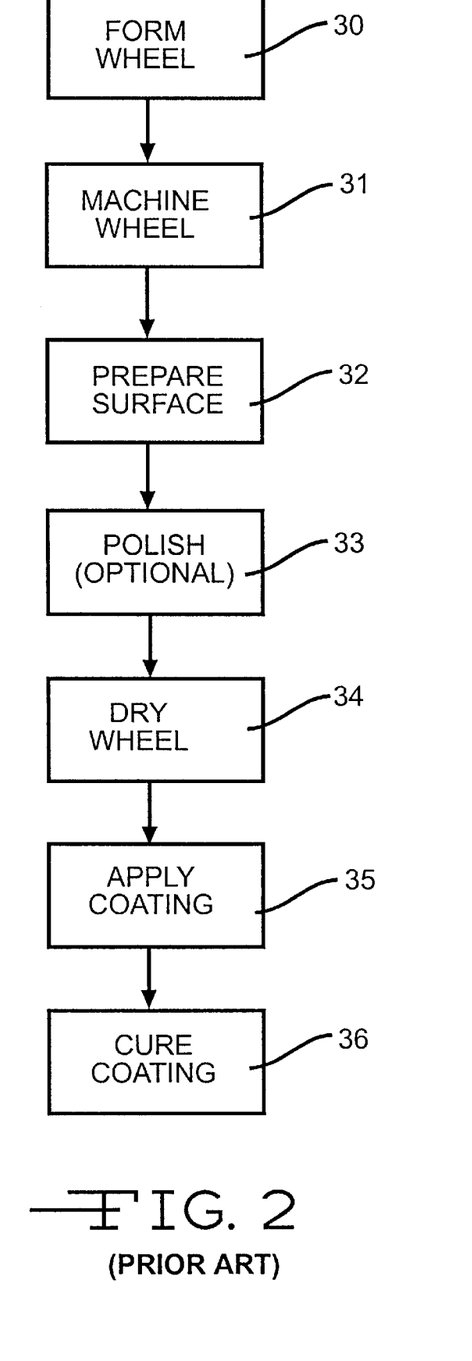
FIG. 2 is a flow chart of a prior art process for manufacturing the wheel shown in FIG. 1.

A flow chart for a typical prior art process for forming the wheel 10 is shown in FIG. 2. In functional block 30, a one piece vehicle wheel casting is formed by a conventional casting process, such as gravity or low pressure casting. The wheel casting is machined to final shape in functional block 31. Typical machining operations include turning the tire bead seats, facing the inboard surface of the wheel hub, boring the pilot hole and drilling the wheel lug holes.

Once the machining is completed, the wheel surface is cleaned in preparation for finishing, as shown in functional block 32. Preparation usually includes immersion in a mild acid bath to remove all machining lubricants and rinsing with water sprays to remove the acid. Additionally, the surface of the wheel may be polished to a high luster, as shown in functional block 33; however, this step is optional. Depending upon the process used, the polishing step may require additional surface preparation to clean polishing residue from the wheel surface. In functional block 34, the wheel is dried by heating to approximately 250° F. in a drying oven. The heating evaporates any rinse water which may have been retained in small pores formed in the surface of the wheel. If not removed from the surface pores, such water could be changed to steam during the curing of a coating applied to the wheel surface in the next step of the process. The expansion of the steam could rupture the coating, thereby marring the appearance of the finished wheel.

In functional block 35, a coating is applied to the wheel. For a polished light weight wheel, the coating is usually a clear coat which protects the polished surface. The clear coat can be applied to the entire wheel or only to the outboard surface of the wheel disc 25. Alternately, a decorative coat of paint can be applied to all or a portion of the outboard surface of the wheel disc. The coating is cured in functional block 36 by heating the wheel in a curing oven to about 350° F. A second clear coat (not shown) is usually applied over the coat of paint and cured to protect the painted surface.

SUMMARY OF THE INVENTION

This invention relates to a light weight wheel which is sealed with a surface coating to assure that the wheel is air tight.

As shown in FIG. 1, one piece wheels typically include a thick sidewall 12 which increases the total weight of the wheel 10. The thick sidewall is a result of the structure of the molds used to cast one piece wheels. The wheel weight would be reduced if a lightener recess or pocket were formed in the sidewall 12. However, as a charge of molten metal is poured into a wheel mold to form a wheel casting, gases often become entrained within the charge. The large volume of metal contained in the sidewall tends to retain pockets of entrapped gas as the molten metal solidifies. As a result, the sidewall 12 tends to have small voids or pockets formed therein. This is in contrast to the thinner portions of the wheel rim which comprise the deep well 17 and leg portion 18. The thinner portions of the wheel rim 11 allow the gas to migrate to the surface of the casting as the molten metal solidifies. Thus, when metal is removed from the sidewall 12 to lighten the wheel 10, the internal gas voids and pockets are exposed to the surface of the wheel. If one or more of these exposed voids or pockets extends through the remaining sidewall to either the opposite surface of the wheel rim 11 or the outboard face of the sidewall 12, the void or pocket will provide a path for the inflation air to escape from a pneumatic tire mounted thereon. Such wheels are commonly referred to as "leakers" and are scrapped. Accordingly, it would be desirable to provide a process for forming a one piece wheel with lightener pockets which is not a leaker. It would also be desirable to prevent leakage from other portions of light weight one piece and multi-piece wheels.

The present invention contemplates a vehicle wheel having an annular wheel rim adapted to support a pneumatic vehicle tire and a circular wheel disc formed across an end of the wheel rim. A layer of sealant is disposed over a portion of a surface of at least one of the wheel rim or the wheel disc. The sealant forms an airtight seal over the portion of the wheel surface covered by the sealant.

In the preferred embodiment, the layer of sealant is formed from an epoxy resin. Additionally, the sealant can be a thermosetting epoxy resin. The invention also contemplates that a protective or a decorative coating can extend over at least a portion of the layer of sealant.

The invention further contemplates that the wheel rim and the wheel disc cooperate to form a wheel sidewall which has at least one lightener recess formed therein with the sealant disposed over at least a portion of a surface of the sidewall recess. The recess can extend substantially around the circumference of the wheel sidewall or can include a plurality of individual pockets formed around the circumference of the sidewall. Alternately, the layer of sealant can be applied to a portion of a radially outer surface of the wheel rim.

It will be appreciated that the invention can be practiced upon either a one piece wheel or a multi-piece wheel. One type of a multi-piece wheel is a two piece wheel which includes a wheel disc attached to the outboard end of a partial wheel rim. In the preferred embodiment of a two piece wheel the wheel disc is a full face wheel disc which includes a wheel sidewall. The wheel sidewall has at least one lightener recess formed therein and the sealant is disposed over at least a portion of a surface of the sidewall recess.

The present invention also contemplates a process for forming a vehicle wheel comprising the steps of forming a vehicle wheel and applying a layer of sealant to a portion of a surface of the wheel, the sealant forming an airtight seal over the portion of the wheel surface.

In the preferred embodiment, the wheel is formed with a sidewall portion which has at least one lightener recess formed therein and the layer of sealant is applied to a portion of a surface of the recess. Additionally, the sealant applied to the wheel is a thermosetting epoxy resin and, prior to applying the sealant, the wheel is heated. After applying the sealant, the wheel is maintained above a predetermined temperature for a predetermined time period to cure the sealant. Also, in the preferred embodiment, the sealant is sprayed onto the surface of the recess. Additionally, a decorative coating or a protective coating can be applied to a surface of the wheel.

The process also contemplates applying the layer of sealant to a portion of a radially outer surface of the rim.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 3A:
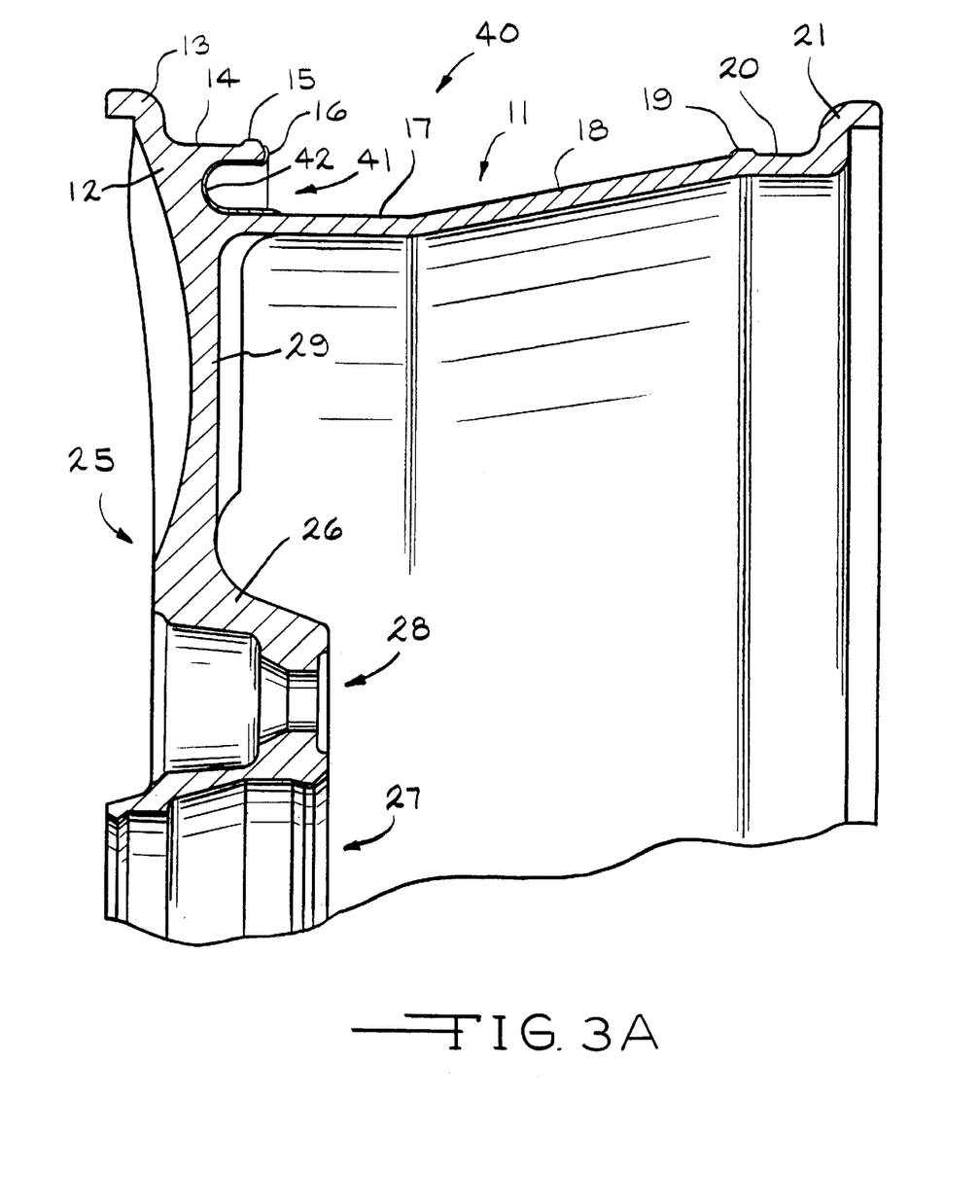
FIG. 3A is a fragmentary sectional view of a one piece wheel according to the invention.

Referring again to the drawings, there is illustrated in FIG. 3A a fragmentary sectional view of an improved wheel 40 formed in accordance with the invention. Portions of the improved wheel 40 which are similar to the prior art wheel 10 shown in FIG. 1 are identified with the same numerical designators. As shown in FIG. 3A, a portion of the side wall 12 has been removed to form a lightener pocket or recess 41 which extends axially beneath the outboard tire bead seat 14 from the drop well wall 16. As shown, the recess 41 is continuous; however, the recess 41 also can be interrupted for a small portion which contains a bore (not shown) for a wheel valve stem. Alternately, a plurality of webs which extend radially across the recess 41 (not shown) can be spaced equally along the recess 41. The recess 41 also can be formed as a plurality of lightener pockets spaced uniformly about the face of the deep well wall 16 (not shown).

Figure 3B:
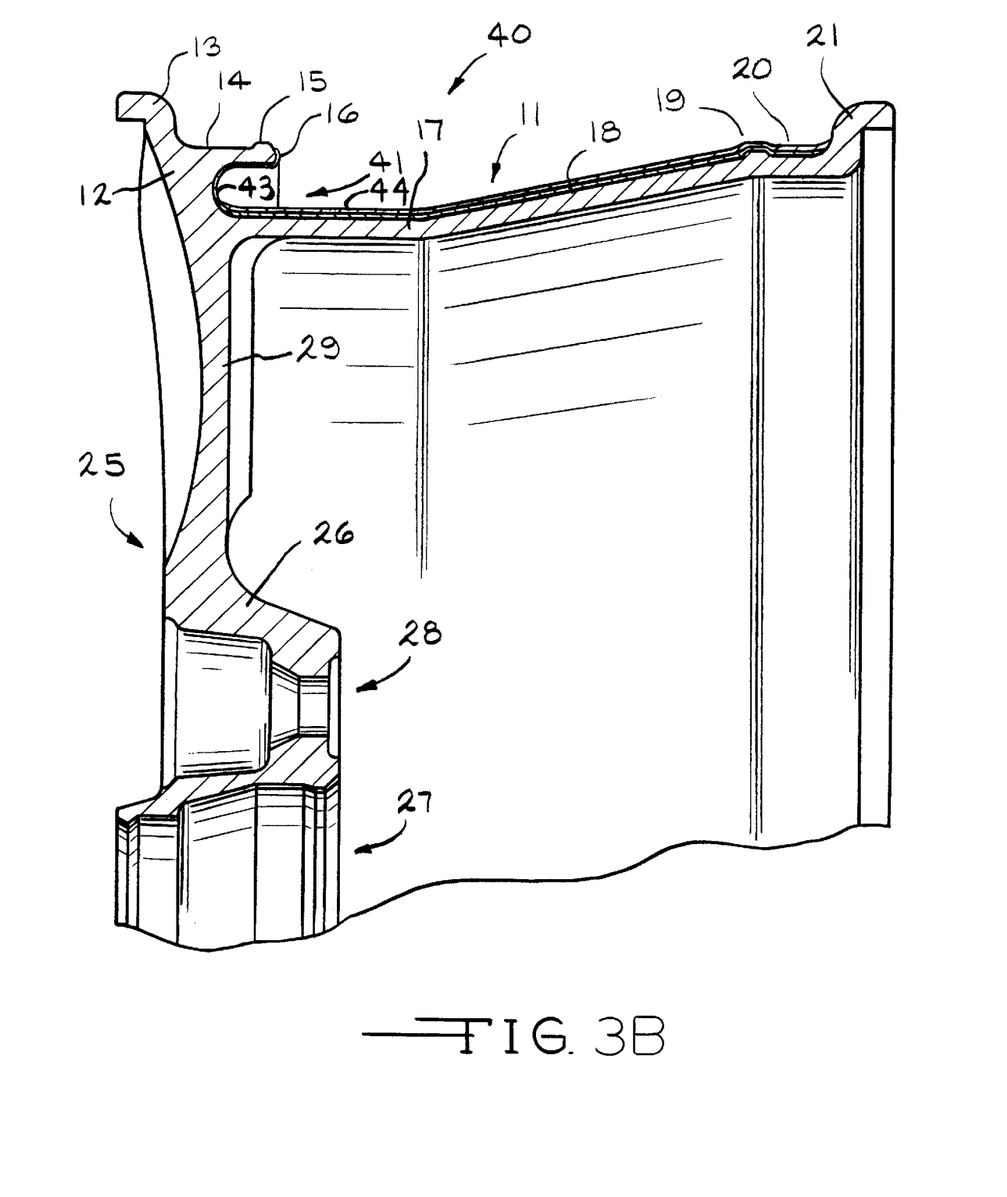
FIG. 3B is a fragmentary sectional view of an alternate embodiment of the wheel shown in FIG. 3A.

A layer 42 of an air tight sealant covers the surface of the lightener recess 41. The sealant layer 42 fills the openings to any gas pockets formed in the sidewall 12 which communicate with the recess 41 and thereby prevents air leakage from a tire mounted upon the wheel rim 11 (not shown). In the preferred embodiment, the sealant layer 42 covers only the surface of the recess 41; however, as shown in FIG. 3B, the invention also contemplates extending a sealant layer 43 axially across the outer surface of the wheel rim 11. In FIG. 3B, the sealant layer 43 extends completely across the deep well 17 and leg portion 18 to the inboard tire bead retaining flange 21 to seal the entire rim 11. It is further contemplated that the sealant can be applied to portions of other surfaces of the wheel rim 11 and/or the wheel disc 25 (not shown) as needed to prevent air leakage therethrough.

In the preferred embodiment, the sealant is a thermosetting epoxy resin which, upon heating, can be sprayed onto the wheel surface. Upon curing, the epoxy resin forms an air tight layer. An epoxy resin which has been successfully used to from the sealant layer 43 is Product 4X-017 which is available from Crosslink Technology, Inc. The invention contemplates spraying Product 4X-017 onto a wheel which has been heated above 350° F. The wheel is then maintained above 350° F. for about 15 minutes to cure the resin. The improved wheel 40 is both lighter than the prior art wheel 10 described above and sealed to prevent air leakage therethrough.

As shown in FIG. 3B, the invention also contemplates that the wheel 40 can include a decorative or protective layer 44 which covers a portion of the sealant layer 43. The decorative/protective layer 44 is optional. The decorative layer would be formed from a paint while the protective layer would be formed from a clear coat. While the decorative/protective layer 44 is shown in FIG. 3B as extending across the surface of the wheel rim 11, the decorative layer also can cover the entire wheel 40 (not shown) or other portions than shown in FIG. 3B. The invention also contemplates applying both a decorative layer of paint and a protective clear coat layer to the wheel (not shown). Additionally, while the decorative/protective layer 44 is illustrated as covering the sealant layer 43, it will be appreciated that the sealant layer 43 can also be applied over a portion of the decorative/protective layer 44 (not shown).

Figure 4:
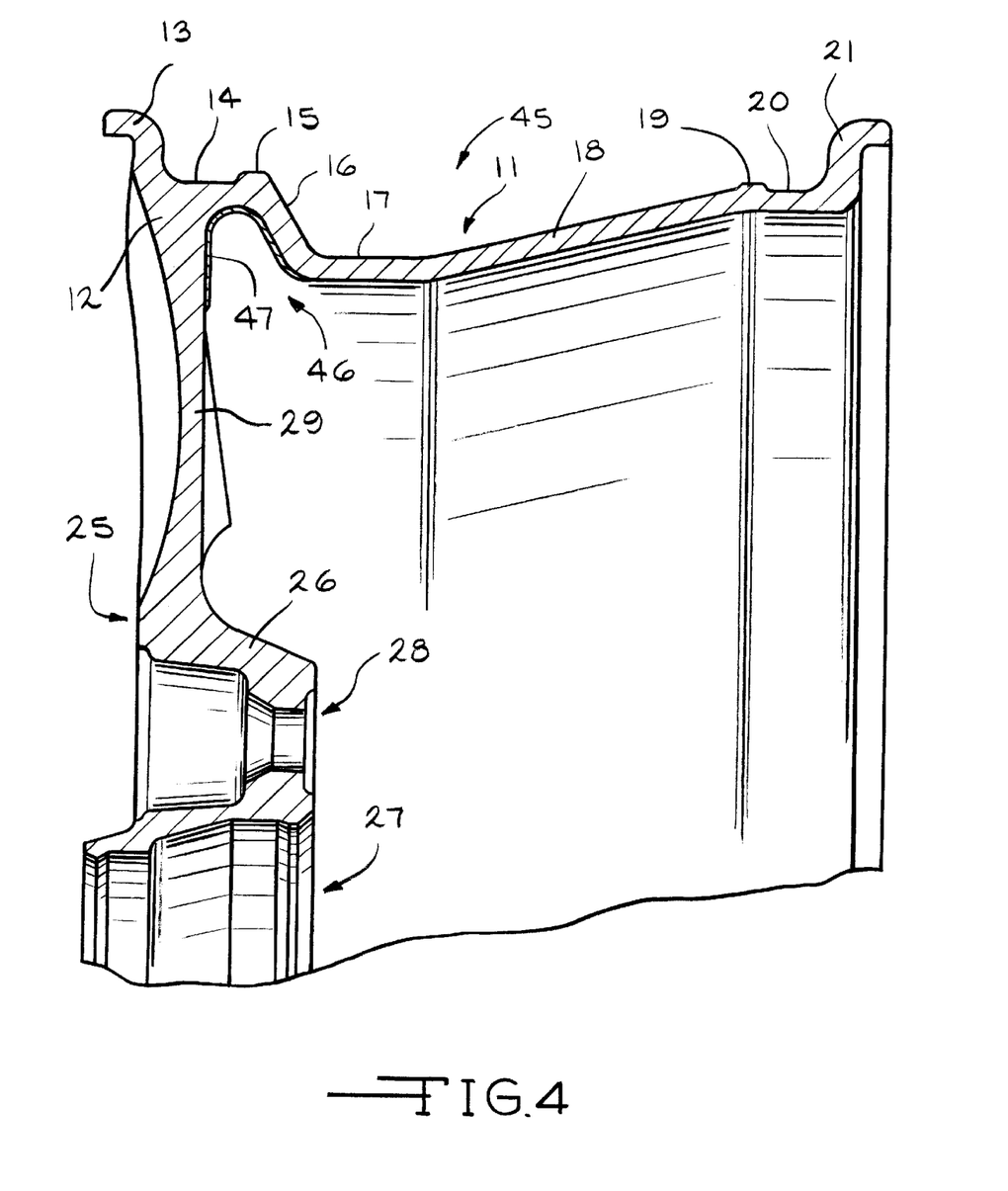
FIG. 4 is a fragmentary sectional view of another alternate embodiment of the wheel shown in FIG. 3A.

An alternate embodiment 45 of the improved vehicle wheel is shown in FIG. 4. As above, portions or the wheel 45 which are the same as the prior art wheel 10 shown in FIG. 1 are identified by the same numerical designators. As shown in FIG. 4, a portion of the side wall 12 has been removed to form a lightener pocket or recess 46 which extends radially into the sidewall 12 beneath the outboard tire bead seat 14 from an inner surface of the wheel rim 11. As shown, the recess 46 is continuous; however, the recess 46 also can be interrupted for a small portion which includes a bore (not shown) for a wheel valve stem. Alternately, a plurality of webs which extend axially across the recess 46 (not shown) can be spaced equally along the recess 46. The recess 46 also can be formed as a plurality of lightener pockets spaced uniformly along the inner surface of the wheel rim 11 (not shown).

A layer 47 of an air tight sealant covers the surface of the lightener recess 46. In the preferred embodiment, the sealant layer 47 covers only the surface of the recess 46; however, the invention also contemplates extending the sealant layer 47 axially across the inner surface of the wheel rim 11 (not shown). The sealant layer can extend completely across the inner surface of the deep well 17 and leg portion 18 to the outboard tire bead retaining flange 21.

The present invention also contemplates a process for forming the improved wheels 40 and 45 shown in FIGS. 3A through 4. The process is illustrated by the flow chart shown in FIG. 5. Similar to the prior art process shown in FIG. 2, the process illustrated in FIG. 5 begins by forming a wheel casting in functional block 50 by a conventional casting method, such as gravity or low pressure casting. The wheel casting is machined to final shape in functional block 51. Then, a lightener pocket or recess is formed in the sidewall portion of the wheel in functional block 52 by a conventional process, such as undercutting. Alternately, the lightener pocket can be formed during the casting process. If a plurality of lightener pockets are desired, the sidewall can be ground away to form the pockets or the pockets can be formed during the casting process. The forming of the lightener recess is shown as an optional step in FIG. 5 because it is contemplated that the process also can be applied to wheels which do not include lightener recesses. In functional block 53, the wheel surface is cleaned in preparation for finishing by immersion in a mild acid bath followed by a water rinsing. As before, the wheel can be optionally polished in functional block 54. The polishing process may include further surface preparation to remove polishing residue from the wheel surface. The wheel is dried in a oven in functional block 55 to assure removal of all moisture from any surface pores or pockets.

Figure 5:
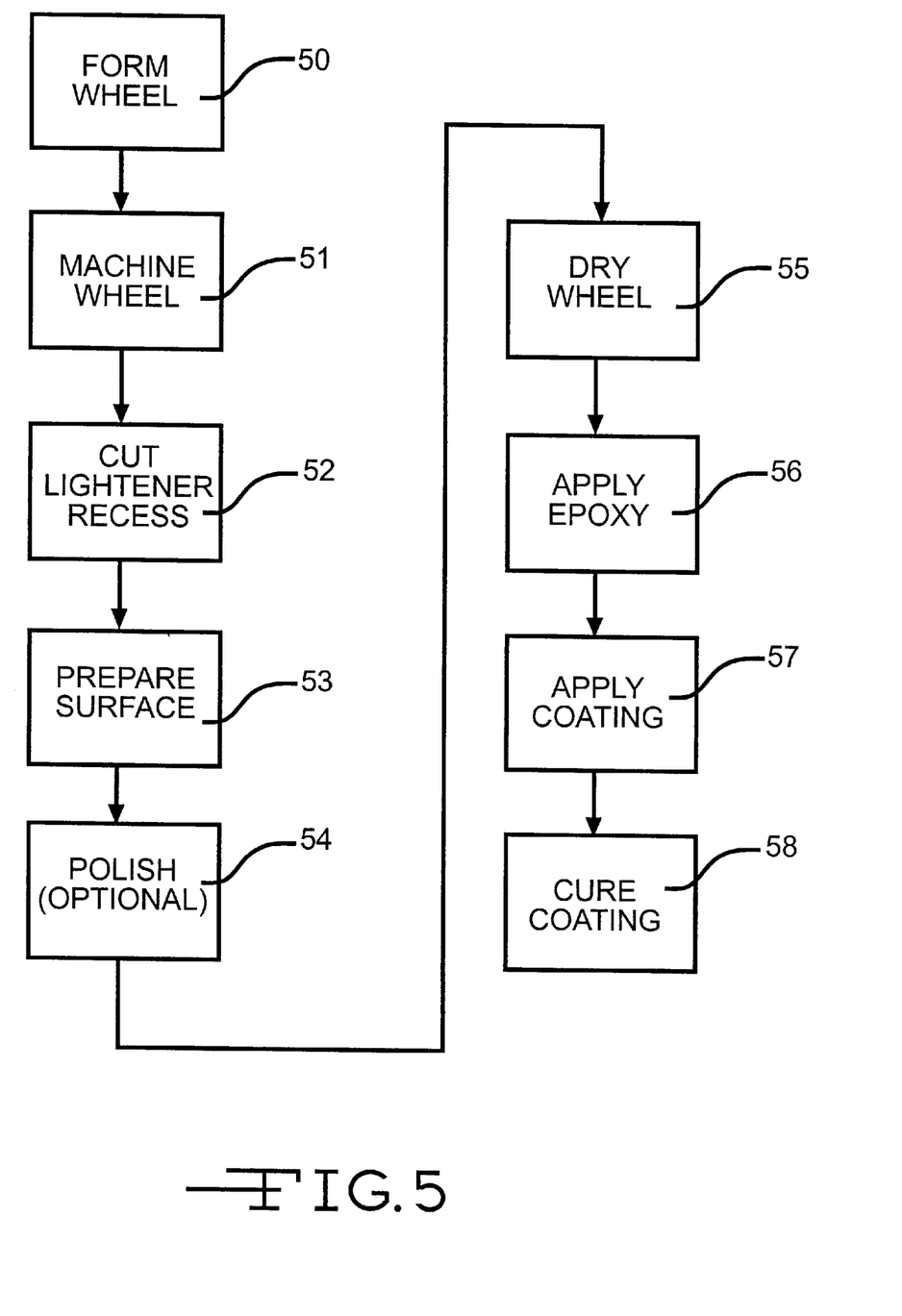
FIG. 5 is a flow chart of a process for manufacturing the wheel shown in FIG. 3A.

A sealant is sprayed onto the surface of the lightener recess in functional block 56. A highly automated process is contemplated with the wheel rotated while a spray head propels a layer of sealant into the recess. Alternately, the sealant can be sprayed onto other surface portions of the wheel. In the preferred embodiment, the sealant is a thermosetting epoxy resin which is sprayed onto the wheel before the wheel has cooled from the drying step in functional block 55 to a temperature which is below the resin activation temperature. Accordingly, the residual heat retained by the wheel from the drying oven will activate the curing cycle of the thermosetting epoxy resin.

In functional block 57, a protective and/or decorative clear coating or decorative paint coating is applied to the wheel; however, this step is optional. In the preferred embodiment, the clear or paint coating is applied only to the outboard face of the wheel disc, which will be visible when a tire is mounted upon the wheel. Thus, the epoxy resin and the clear coating or layer of paint are applied to different wheel surfaces. However, it will be appreciated that the invention also can be practiced with the clear coating or paint applied over the epoxy resin.

In functional block 58, the wheel is inserted into a curing oven and both the epoxy resin and the coating are cured at approximately 350° F. Depending upon the wheel design, additional coats of paint and/or clear coat may be applied to the wheel and cured (not shown). For example, a clear coat may be applied over the layer of paint to protect the paint. If the paint or clear coat is omitted, the epoxy resin is cured in functional block 58. Alternately, if the residual heat remaining in the wheel when the epoxy resin is applied is sufficient to cure the resin, a curing oven is not required for curing the resin.

Figure 6:
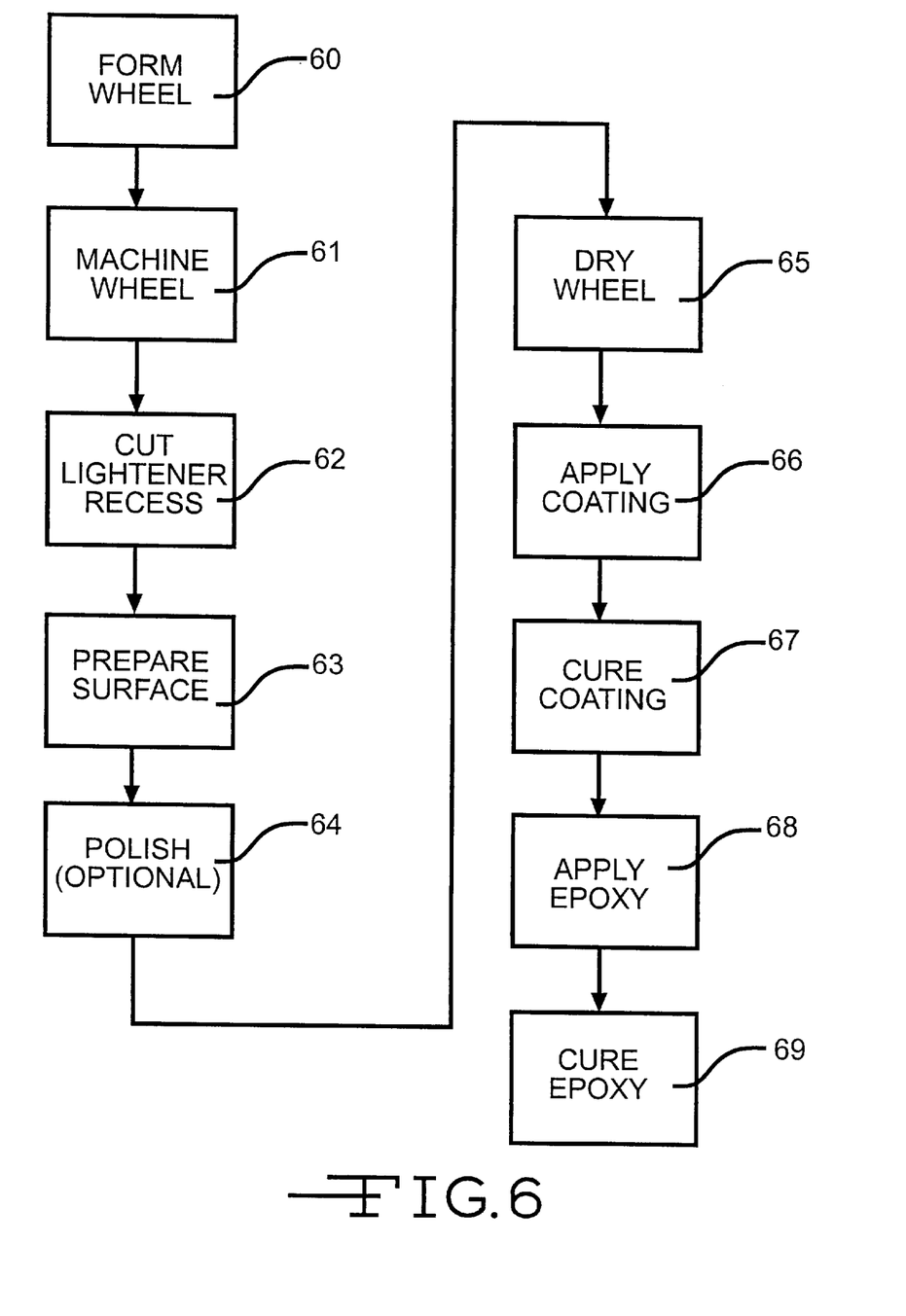
FIG. 6 is a flow chart of an alternate process for manufacturing the wheel shown in FIG. 3A.

An alternate embodiment of the process is illustrated by the flow chart shown in FIG. 6. The initial steps of the process are the same as described above. Thus, a wheel casting is formed in functional block 60. The wheel casting is machined to final shape in functional block 61 and at least one lightener recess is formed in the sidewall in functional block 62. Again, the forming of the lightener recess is shown as an optional step in FIG. 6 because it is contemplated that the process also can be applied to wheels which do not include lightener recesses. The wheel surface is prepared in functional block 63 by cleaning and optional polishing in functional block 64. As before, the cleaned wheel is then dried in functional block 65.

In functional block 66 a protective and/or decorative clear coating or decorative paint coating is applied to the surface of the wheel and cured in functional block 67. As before, these steps can be repeated for additional clear and/or paint coatings. After the decorative coatings are cured, but while the wheel is still hot, the sealing epoxy resin is sprayed onto the surface of the lightener recess and/or other surfaces which are to be sealed in functional block 68. The epoxy is then cured in functional block 69.

Figure 7:
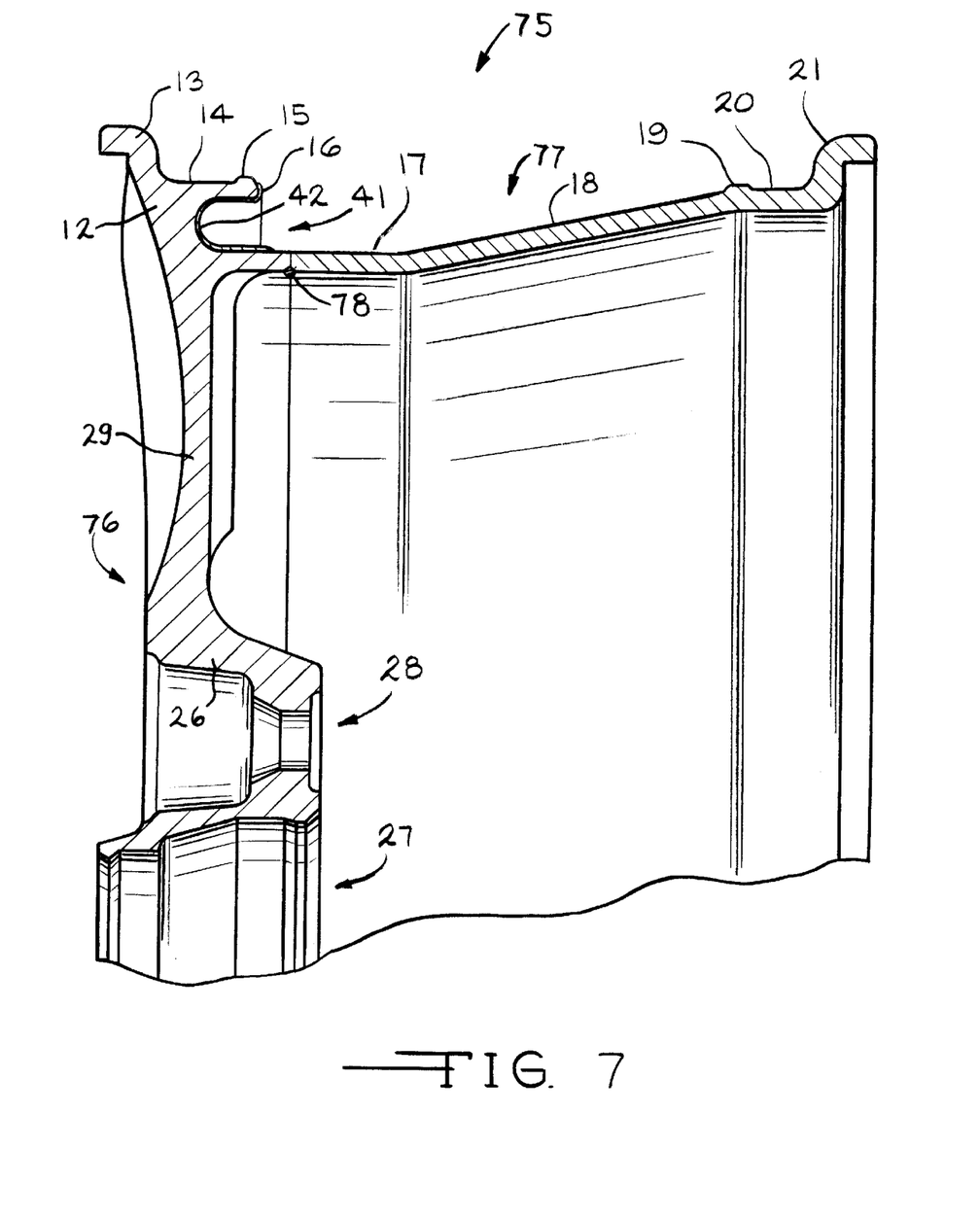
FIG. 7 is a fragmentary sectional view of a two piece wheel in accordance with the invention.

While the preferred embodiment of the invention has been illustrated and described as being applied to a one-piece wheel, it will be appreciated that the invention also can be practiced upon a multi-piece wheel. One example of a multi-piece wheel is a two piece wheel which comprises a circular wheel disc attached to annular wheel rim. A typical full face two piece vehicle wheel 75 is shown in FIG. 7. The two piece wheel 75 includes a full face wheel disc 76 which is formed by a conventional casting or forging process. The wheel disc 76 is attached to the outboard end of a partial wheel rim 77 with a continuous air-tight weld 78. Components of the wheel 75 which are similar to components shown in the preceding figures have the same numerical designators. As shown in FIG. 7, the wheel 75 includes a sealant layer 42 which covers only the surface of the lightener pocket 41; however, it will be appreciated that the sealant layer 42 can extend across the wheel rim 77 (not shown) or cover other surface portions of the wheel 75 (not shown).

The inclusion of the sealant layer allows enlargement of the lightener pocket which further reduces the weight of the wheel. Additionally, the sealant layer permits greater flexibility in the design of light weight wheels by eliminating the potential for air leaks in the finished wheels.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, the process of spraying the epoxy resin can be practiced upon a wheel which has been cooled by adding a step to preheat the wheel before spraying the resin onto the wheel surface. Additionally, the wheel disc may be recessed within the wheel rim. Furthermore, it is contemplated that the sealant can be applied to surfaces of wheels that do not include a lightener recess.

What is claimed is:

1. A vehicle wheel comprising:
   an annular wheel rim adapted to support a pneumatic vehicle tire;
   a circular wheel disc formed across an end of said wheel rim, said wheel disc cooperating with said wheel rim to form a sidewall;
   at least one lightener recess formed in said sidewall, said lightener recess formed by a machining operation; and
   a layer formed only from an epoxy resin disposed over a portion of a surface of said lightener recess, whereby said layer of epoxy resin forms an airtight seal over said portion of said surface.

2. A vehicle wheel according to claim 1 wherein said epoxy resin is a thermosetting epoxy resin.

3. A vehicle wheel according to claim 2 further including one of a protective and a decorative coating which extends over at least a portion of said epoxy resin.

4. A vehicle wheel according to claim 1 wherein an outboard tire bead seat is formed in said wheel sidewall and further wherein said lightener recess extends axially into said wheel sidewall beneath said outboard tire bead seat.

5. A vehicle wheel according to claim 4 wherein said recess extends substantially around the circumference of said sidewall.

6. A vehicle wheel according to claim 5 wherein said layer of sealant is formed from an epoxy resin.

7. A vehicle wheel according to claim 6 wherein said epoxy resin is a thermosetting epoxy resin.

8. A vehicle wheel according to claim 7 further including one of a protective and a decorative coating which extends over at least a portion of said epoxy resin.

9. A vehicle wheel according to claim 4 further including a plurality of lightener recesses formed in said sidewall.

10. A vehicle wheel according to claim 1 wherein an outboard tire bead seat is formed in said wheel sidewall and further wherein said lightener recess extends radially into said wheel sidewall beneath said outboard tire bead seat.

11. A vehicle wheel according to claim 1 wherein said sealant layer extends axially across a radially outer surface of said wheel rim.

12. A vehicle wheel according to claim 11 wherein said layer of sealant is formed from an epoxy resin.

13. A vehicle wheel according to claim 12 wherein said epoxy resin is a thermosetting epoxy resin.

14. A vehicle wheel according to claim 13 further including one of a protective and a decorative coating which extends over at least a portion of said epoxy resin.

15. A vehicle wheel according to claim 1 wherein the wheel is a two piece wheel which includes a wheel disc attached to a wheel rim.

16. A vehicle wheel according to claim 15 wherein said wheel disc is a full face wheel disc which includes a wheel sidewall, said wheel sidewall including at least one lightener recess formed therein and further wherein said sealant is disposed over at least a portion of a surface of said sidewall recess.

17. A process for forming a vehicle wheel comprising the steps of:
   (a) forming a vehicle wheel having an annular wheel rim adapted to support a pneumatic vehicle tire and a circular wheel disc formed across an end of the wheel rim, the wheel disc cooperating with the wheel rim to form a sidewall;
   (b) machining at least one lightener recess into the sidewall; and
   (c) applying a layer formed only from an epoxy resin to a portion of a surface of the lightener recess, the sealant forming an airtight seal over the portion of the surface.

18. The process according to claim 17 wherein the sealant applied in step (b) is a thermosetting epoxy resin and further wherein, prior to step (b), the wheel is heated.

19. The process according to claim 18 wherein, subsequent to step (b), the wheel is maintained above a predetermined temperature for a predetermined time period to cure the sealant.

20. The process according to claim 19 wherein step (b) includes spraying the sealant onto the surface of the recess.

21. The process according to claim 20 further including, prior to step (b), applying at least one of a decorative coating and a protective coating to a surface of the wheel.

22. The process according to claim 20 further including, subsequent to step (b), applying at least one of a decorative coating and a protective coating to a surface of the wheel.

23. A process according to claim 17 wherein the wheel formed in step (a) includes a rim portion and in step (b) the layer of sealant is applied to a portion of a radially outer surface of the rim.

24. The process according to claim 23 wherein the sealant applied in step (b) is a thermosetting epoxy resin and further wherein, prior to step (b), the wheel is heated.

25. The process according to claim 24 wherein, subsequent to step (b), the wheel is maintained above a predetermined temperature for a predetermined time period to cure the sealant.

26. The process according to claim 25 wherein step (b) includes spraying the sealant onto the surface of the recess.

27. The process according to claim 26 further including, prior to step (b), applying at least one of a decorative coating and a protective coating to a surface of the wheel.

28. The process according to claim 26 further including, subsequent to step (b), applying at least one of a decorative coating and a protective coating to a surface of the wheel.

* * * * *